US012525123B2

(12) United States Patent
Zeiynali Farid et al.

(10) Patent No.: US 12,525,123 B2
(45) Date of Patent: Jan. 13, 2026

(54) SYSTEMS, METHODS, AND NON-TRANSITORY COMPUTER-READABLE MEDIUMS FOR ESTIMATING A RESIDUAL TIME OF A CURRENT TRAFFIC SIGNAL

(71) Applicant: Toyota Motor Engineering & Manufacturing North America, Inc., Plano, TX (US)

(72) Inventors: Yashar Zeiynali Farid, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota Aichi-ken (JP)

( * ) Notice: Subject to any disclaimer, the term of this patent is extended or adjusted under 35 U.S.C. 154(b) by 415 days.

(21) Appl. No.: 18/110,545

(22) Filed: Feb. 16, 2023

(65) Prior Publication Data

US 2024/0282191 A1    Aug. 22, 2024

(51) Int. Cl.
*G08G 1/01* (2006.01)
*G04F 3/06* (2006.01)

(52) U.S. Cl.
CPC ............ *G08G 1/0137* (2013.01); *G04F 3/06* (2013.01); *G08G 1/012* (2013.01); *G08G 1/0125* (2013.01)

(58) Field of Classification Search
None
See application file for complete search history.

(56) References Cited

U.S. PATENT DOCUMENTS 9,043,143 B2 * 5/2015 Han .................. G01C 21/3492
701/423
9,672,734 B1 * 6/2017 Ratnasingam ... G08G 1/096741
9,697,729 B2    7/2017 Vahidi et al.
(Continued)

FOREIGN PATENT DOCUMENTS

CN          105989720 A      10/2016
CN          114582146 A  *   6/2022
(Continued)

OTHER PUBLICATIONS

S. Alireza Fayazi et al., "Traffic Signal Phase and Timing Estimation from Low-Frequency Transit Bus Data", IEEE Transactions on Intelligent Transportation Systems, vol. 16, No. 1, pp. 19-28, Feb. 2015.

*Primary Examiner* — Peter D Nolan
*Assistant Examiner* — Jacob Kent Besteman-Street
(74) *Attorney, Agent, or Firm* — Dinsmore & Shohl LLP

(57) ABSTRACT

Systems, methods, and non-transitory computer-readable mediums for estimating a residual time of a current traffic signal are provided. The methods include estimating an initial residual time of a current traffic signal until a change of the current traffic signal based on a signal plan and information received from vehicle sensors, collecting information about a vehicle queue, estimating a residual time of the current traffic signal until the change of the current traffic signal based on the information about the vehicle queue, and estimating a final residual time of the current traffic signal until the change of the current traffic signal based on the initial residual time and the estimated residual time of the current traffic signal.

20 Claims, 9 Drawing Sheets

(56) References Cited

U.S. PATENT DOCUMENTS

| | | | | |
|---|---|---|---|---|
| 10,115,305 | B2* | 10/2018 | Mortazavi | G01C 21/3415 |
| 11,270,581 | B1* | 3/2022 | Palumbo | G08G 1/052 |
| 11,654,913 | B2* | 5/2023 | Sarlashkar | B60W 40/04 |
| | | | | 701/23 |
| 11,854,212 | B2* | 12/2023 | Meijburg | H04W 4/38 |
| 2015/0057923 | A1* | 2/2015 | Han | G08G 1/096844 |
| | | | | 701/465 |
| 2018/0096597 | A1* | 4/2018 | Mortazavi | H04W 4/023 |
| 2020/0143674 | A1* | 5/2020 | Wölfl | G08G 1/095 |
| 2020/0148210 | A1 | 5/2020 | Naserian et al. | |
| 2021/0039648 | A1 | 2/2021 | Ferguson et al. | |
| 2021/0261152 | A1* | 8/2021 | Meijburg | B60W 60/001 |
| 2022/0281455 | A1* | 9/2022 | Sarlashkar | B60W 40/105 |
| 2023/0061098 | A1* | 3/2023 | Kim | B60W 60/0027 |
| 2024/0278782 | A1* | 8/2024 | Kelkar | B60W 60/001 |
| 2024/0278783 | A1* | 8/2024 | Kelkar | B60W 50/14 |
| 2025/0256721 | A1* | 8/2025 | Kim | B60W 30/18027 |

FOREIGN PATENT DOCUMENTS

| | | | |
|---|---|---|---|
| JP | 2002-257561 | A | 9/2002 |
| JP | 2009-227141 | A | 10/2009 |
| JP | 2011-068308 | A | 4/2011 |
| JP | 2011-111031 | A | 6/2011 |
| JP | 2022-541223 | A | 9/2022 |

* cited by examiner

SYSTEMS, METHODS, AND NON-TRANSITORY COMPUTER-READABLE MEDIUMS FOR ESTIMATING A RESIDUAL TIME OF A CURRENT TRAFFIC SIGNAL

TECHNICAL FIELD

The present disclosure relates to systems, methods, and non-transitory computer-readable mediums for estimating a residual time of a current traffic signal.

BACKGROUND

Accurately estimating a current state of traffic information plays a key role in the success of a vehicle's motion planning systems. An important traffic state includes a signal plan. However, just knowing the phase of the signal (e.g., red or green) is insufficient. When a vehicle plans its behaviors (e.g., acceleration or lane-change), it is necessary to exactly know the current state of the signal and when the next phase will begin. For example, in signalized roadways, knowledge of traffic signal plans and timings plays an important role in the success of various applications such as Green Light Optimized Speed Advisory (GLOSA), intersection red light running (RLR), signal priority, and emergency vehicle pre-emption. Conventional systems and methods have been proposed for obtaining phase durations and cycle lengths, but they do not accurately estimate the real-time residual time of a phase, such as, how much time remains until the next green phase begins.

Accordingly, a need exists for systems, methods, and non-transitory computer-readable mediums that accurately estimate a residual time of a current traffic signal.

SUMMARY

The present disclosure provides systems, methods, and non-transitory computer-readable mediums for estimating a residual time of a current traffic signal. The systems, methods, and non-transitory computer-readable mediums accurately estimate a residual time of a current traffic signal and reduce the uncertainty of the residual time of a current traffic signal by estimating an initial residual time of a current traffic signal until a change of the current traffic signal, estimating a residual time of the current traffic signal until the change of the current traffic signal based on the information about the vehicle queue, and estimating a final residual time of the current traffic signal until the change of the current traffic signal based on the initial residual time and the estimated residual time of the current traffic signal using a signal plan and vehicles sensors. With the accurate estimation of the residual time of the current traffic signal, the ego vehicle may have an efficient motion system, such as acceleration, lane-change, to exit the intersection without stopping and additional delay.

In one or more embodiments, a method of estimating a residual time of a current traffic signal includes estimating an initial residual time of a current traffic signal until a change of the current traffic signal based on a signal plan and information received from vehicle sensors, collecting information about a vehicle queue, estimating a residual time of the current traffic signal until the change of the current traffic signal based on the information about the vehicle queue, and estimating a final residual time of the current traffic signal until the change of the current traffic signal based on the initial residual time and the estimated residual time of the current traffic signal.

In another embodiment, a system of estimating a residual time of a current traffic signal includes a controller. The controller is programmed to estimate an initial residual time of a current traffic signal until a change of the current traffic signal based on a signal plan and information received from vehicle sensors, collect information about a vehicle queue, estimate a residual time of the current traffic signal until the change of the current traffic signal based on the information about the vehicle queue, and estimate a final residual time of the current traffic signal until the change of the current traffic signal based on the initial residual time and the estimated residual time of the current traffic signal.

In yet another embodiment, a non-transitory computer-readable medium for estimating a residual time of a current traffic signal that, when executed by a controller, causes the controller to estimate an initial residual time of a current traffic signal until a change of the current traffic signal based on a signal plan and information received from vehicle sensors, collect information about a vehicle queue, estimate a residual time of the current traffic signal until the change of the current traffic signal based on the information about the vehicle queue, and estimate a final residual time of the current traffic signal until the change of the current traffic signal based on the initial residual time and the estimated residual time of the current traffic signal.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1A:
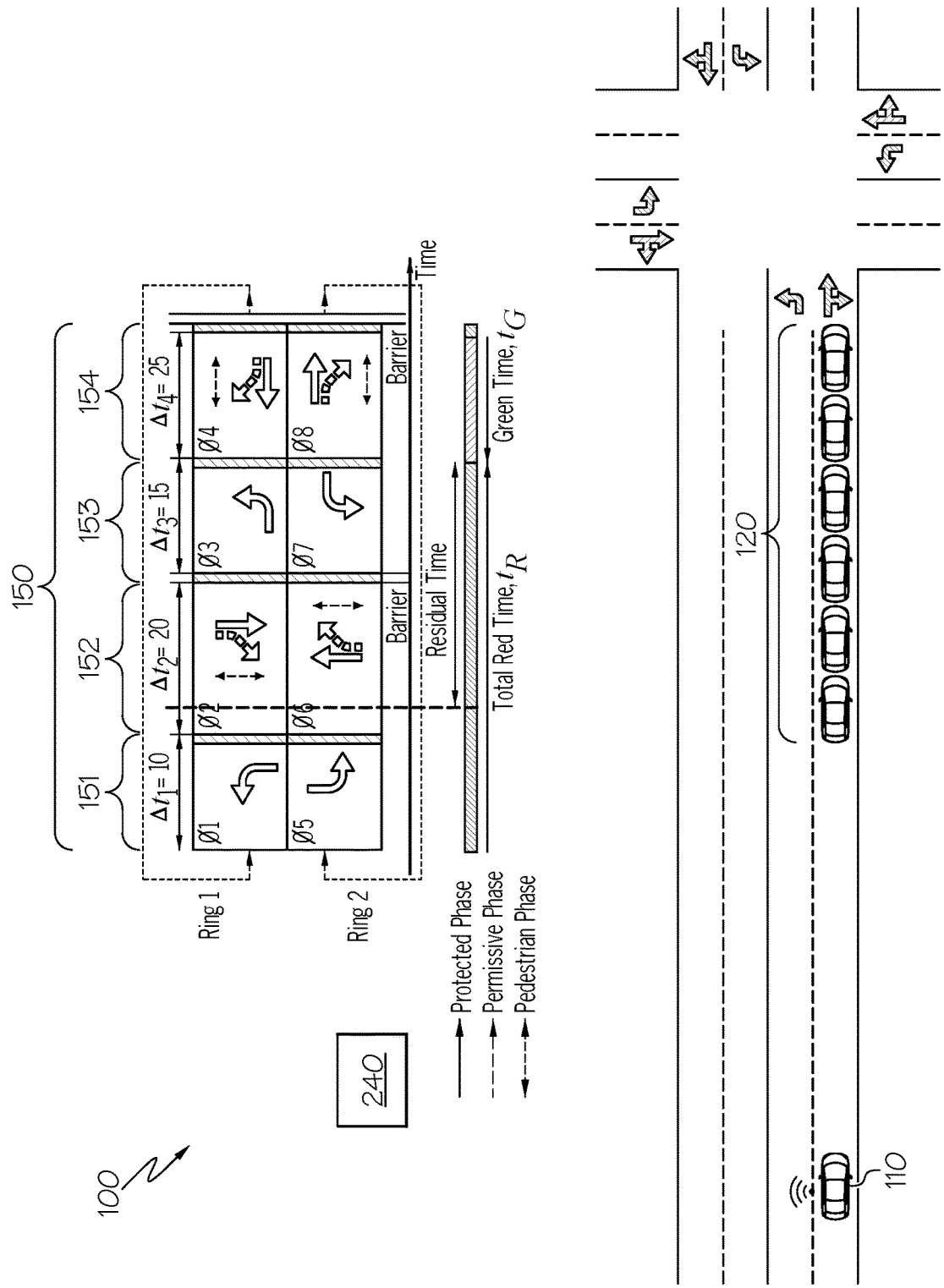
FIGS. 1A-1E depict an exemplary system of estimating the residual time of a current traffic signal, according to one or more embodiments shown and described herein.

The embodiments disclosed herein include systems, methods, and non-transitory computer-readable mediums for estimating a residual time of a current traffic signal. The systems, methods, and non-transitory computer-readable mediums accurately estimate a residual time of a current traffic signal by estimating an initial residual time of a current traffic signal until a change of the current traffic signal, estimating a residual time of the current traffic signal until the change of the current traffic signal based on the information about the vehicle queue; and estimating a final residual time of the current traffic signal until the change of the current traffic signal based on the initial residual time and the estimated residual time of the current traffic signal using a signal plan and vehicles sensors.

FIGS. 1A-1E depict an exemplary system of estimating a residual time of a current traffic signal, according to one or more embodiments shown and described herein.

Referring to FIGS. 1A-1E, the system 100 of estimating a residual time of a current traffic signal 150 includes an ego vehicle 110. The vehicle queue 120 may exist and stop at the intersection. The ego vehicle 110 may approach the vehicle queue 120.

The ego vehicle 110 may be a vehicle including an automobile or any other passenger or non-passenger vehicle such as, for example, a terrestrial, aquatic, and/or airborne vehicle. In some embodiments, the ego vehicle 110 may be an autonomous driving vehicle. The ego vehicle 110 may be an autonomous vehicle that navigates its environment with limited human input or without human input. The ego vehicle 110 may be equipped with internet access and share data with other devices both inside and outside the ego vehicle 110. The ego vehicle 110 may communicate with the server 240, and transmit its data to the server 240. For example, the ego vehicle 110 transmits information about its current location and destination, its environment, information about a current driver, information about a task that it is currently implementing, and the like. The ego vehicle 110 may include an actuator configured to move the ego vehicle 110.

Referring to FIG. 1A, the ego vehicle 110 may estimate an initial residual time of a current traffic signal 150 until a change of the current traffic signal 150 based on a signal plan and information received from vehicle sensors. The term "residual time" may refer to a duration of from a current time, for example, when the ego vehicle 110 is at the position in FIG. 1A, to a time when the traffic signal changes.

The vehicle queue 120 may include a plurality of vehicles. In some embodiments, the vehicle queue 120 may exist and stop at the intersection, an on-ramp of a highway, an off-ramp of a highway, or combinations thereof.

The signal plan may include information about various phases for different vehicles and pedestrian movements, phase durations for different vehicles and pedestrian movements, and a ring-and-barrier diagram. The ring-and-barrier diagram may separate conflicting phases and plan sequences of the phases.

The signal plan may include the current traffic signal 150. The signal plan may be stored in the server 240, such as a cloud server. The current traffic signal 150 may include a ring-and-barrier diagram. The current traffic signal 150 may include two rings. Phases of a ring may operate one after another. For instance, phases 1 and 5 may operate together for the duration of the phases, then phases 2 and 6 operate, and so on. In a fixed-time signal, the phase durations ($\Delta t_1$-$\Delta t_4$) are fixed, while in actuated or adaptive signals, the durations may vary between a minimum and maximum values.

Still referring to FIG. 1A, the current traffic signal 150 may include a first red signal 151, a second red signal 152, a third red signal 153, and a first green signal 154. A pedestrian 130 may move in the second red signal 152. For example, in the second red signal 152, the pedestrian 130 may cross a crosswalk on the road where the vehicle queue 120 exists.

The current traffic signal 150 may be detected by the vehicle sensors. In embodiments, the current traffic signal 150 may be detected by the vehicle sensors, such as a camera, of the ego vehicle 110. In embodiments, the current traffic signal 150 may be stored in the server 240, such as a cloud server.

Figure 1B:
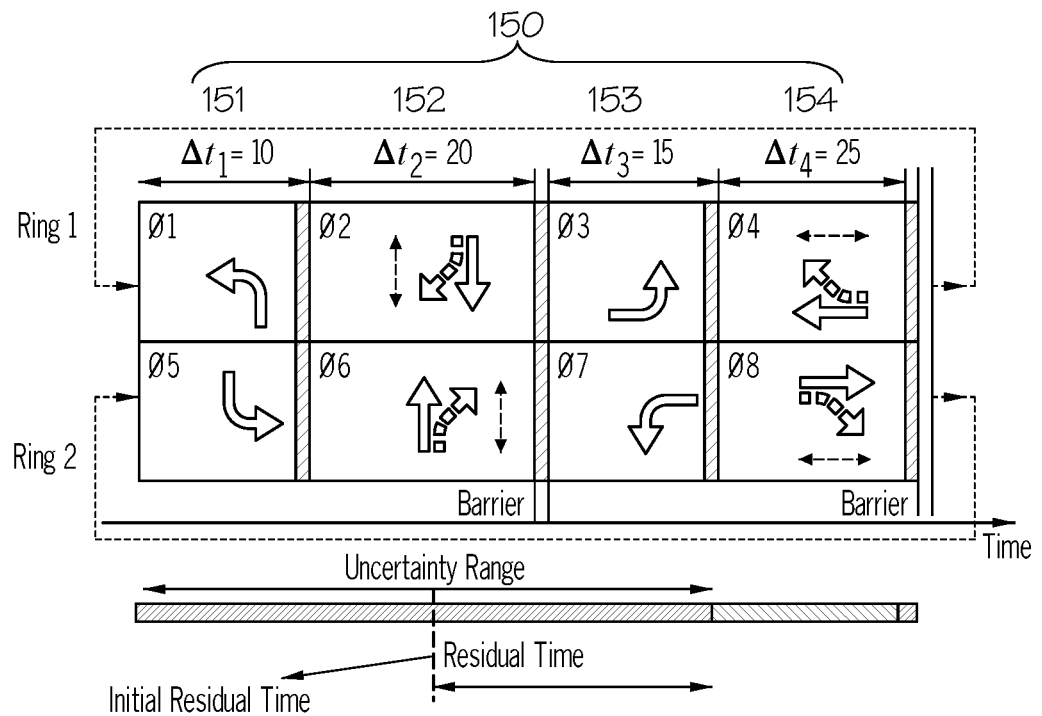

Referring to FIG. 1B, the ego vehicle 110 may detect the current traffic signal 150 by the vehicle sensors. For example, the ego vehicle 110 may detect that the current traffic signal 150 is a red signal to the ego vehicle 110. In response to detecting the current traffic signal 150 as a red signal, the ego vehicle 110 may estimate that the current time is within the periods of the first red signal, the second red signal 152, and the third red signal 153, i.e., an uncertainty range, and determine a middle point of a total time ($t_R$) of the first red signal 151, the second red signal 152, and the third red signal 153 as the initial residual time. For example, as shown in the below equation 1, a middle point of a total time ($t_R$) of the first red signal 151, the second red signal 152, and the third red signal 153 may be determined as the initial residual time ($\Delta t_0^{res}$)

$$\Delta t_0^{res} = \frac{t_R}{2} = 22.5 \text{ s} \qquad \text{Equation 1}$$

Figure 1C:
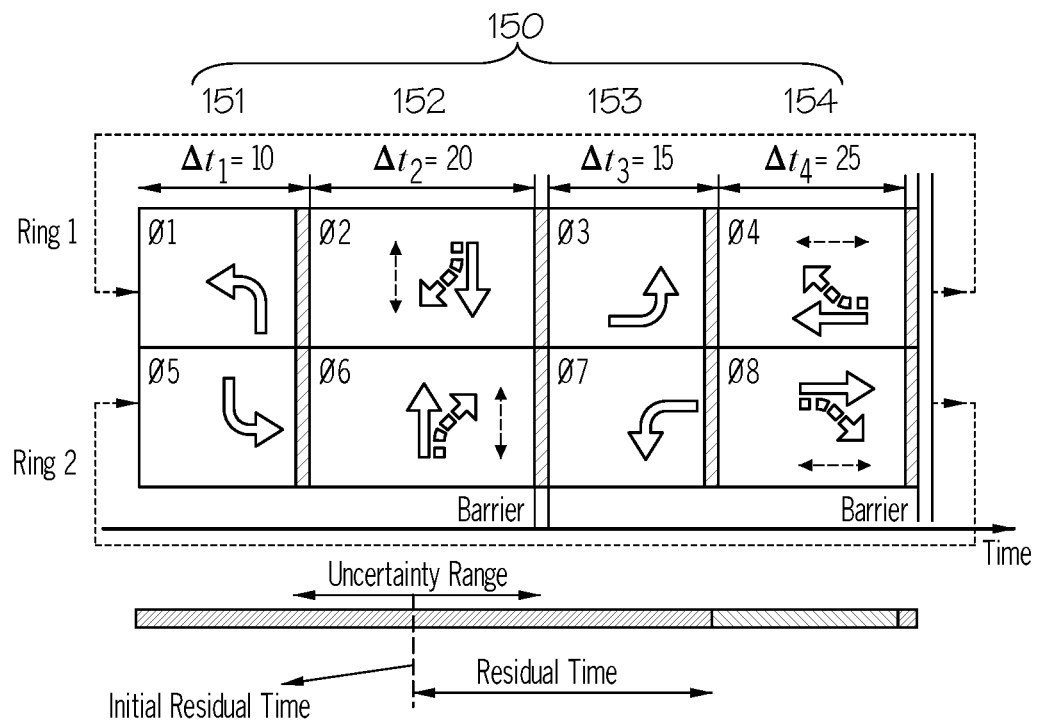

Referring to FIG. 1C, the ego vehicle 110 may detect the current traffic signal 150 and the movement of other vehicles excluded from the vehicle queue 120 by the vehicle sensors. The movement of other vehicles excluded from the vehicle queue 120 may include the movement of facing the opposite direction of the ego vehicle 110 of other vehicles, the movement of other vehicles crossing a path of the ego vehicle 110, or both.

In response to detecting the current traffic signal 150 being the second red signal 152 and the movement of other vehicles (e.g., vehicles moving in a direction perpendicular to the driving direction of the ego vehicle 110), the ego vehicle 110 may estimate that the current time is within the period of the second red signal 152, i.e., an uncertainty range, and determine a sum of a total time of the third red signal 153 and a middle point of a time of the second red signal 152 as the initial residual time. For example, as shown in the below equation 2, a sum $$\left(\Delta t_{\phi 3} + \frac{\Delta t_{\phi 2}}{2}\right)$$

of a total time ($\Delta t_{\phi 3}$) of the third red signal 153 and a middle point of a time $$\left(\frac{\Delta t_{\phi 2}}{2}\right)$$

or the second red signal 152 may be determined as the initial residual time ($\Delta t_0^{res}$).

$$\Delta t_0^{res} = \Delta t_{\phi 3} + \frac{\Delta t_{\phi 2}}{2} = 15 + \frac{20}{2} = 25 \, s \qquad \text{Equation 2}$$

Referring to FIGS. 1A-1C, the ego vehicle 110 may collect information about the vehicle queue 120. In embodiments, the ego vehicle 110 may collect information about the vehicle queue 120 detected by the vehicle sensors, such as the vehicle sensors of the ego vehicle 110. In some embodiments, the ego vehicle 110 may collect information about the vehicle queue 120 by receiving information about the vehicle queue 120 from the server 240, such as a cloud server. Information about the vehicle queue 120 may include a length of the vehicle queue 120, a position of a tail of the vehicle queue 120, a position of a head of the vehicle queue 120, the position of the vehicle queue 120 relative to the intersection, the position of the vehicle queue 120 relative to the ego vehicle 110, the movement of the pedestrian 130 in the intersection, the movement of other vehicles at other approaches in the intersection, traffic signal at other approaches in the intersection, a signal for the pedestrian 130, road density in the intersection, or combinations thereof.

The ego vehicle 110 may estimate a residual time of the current traffic signal 150 until the change of the current traffic signal 150 based on the information about the vehicle queue 120. In some embodiments, the ego vehicle 110 may estimate traffic flow rate on the road on which the ego vehicle 110 is driving, traffic density on the road on which the ego vehicle 110 is driving, or both. In some embodiments, the traffic flow rate, the traffic density, or both, may be estimated by the vehicle sensors of the ego vehicle 110, the vehicle sensors of vehicles in the vehicle queue 120, or both. In some embodiments, the vehicles in the vehicle queue 120 may estimate the traffic flow rate, the traffic density, or both and then transfer the data of the traffic flow rate, the traffic density, or both to the server 240. The ego vehicle 110 may receive the data of the traffic flow rate, the traffic density, or both from the server 240.

Figure 1D:
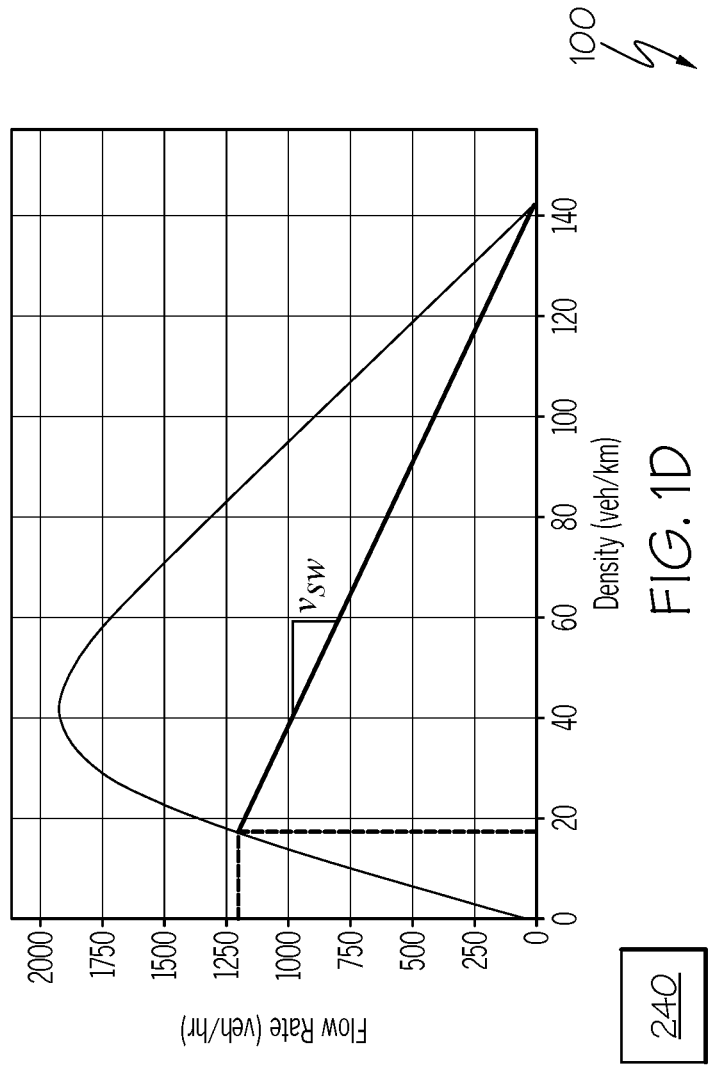

Using a macroscopic traffic model shown in FIG. 1D, the ego vehicle 110 may estimate both traffic flow rate and traffic density when the ego vehicle 110 only estimates one of the traffic flow rate and the traffic density. The macroscopic model shows a differential flow rate (y-axis) as a function of the traffic density (x-axis). For example, when the ego vehicle 110 estimates the traffic density as 19 veh/km, the traffic flow may be calculated as 1200 veh/hr at a first time as shown in FIG. 1D.

The ego vehicle 110 may estimate the average speed ($v_{sw}$) of the backward propagation of the vehicle queue 120 based on the estimated traffic flow rate, the estimated traffic density, or both. The backward propagation of the vehicle queue 120 occurs as more vehicles join the vehicle queue 120 and stop. For example, the ego vehicle 110 may estimate the average speed ($v_{sw}$) of the backward propagation of the vehicle queue 120 based on the estimated traffic flow rate, the estimated traffic density, or both, using a macroscopic traffic model as shown in FIG. 1D. Using a macroscopic traffic model, the ego vehicle 110 may estimate the average speed ($v_{sw}$) of the backward propagation of the vehicle queue 120. For example, the average speed ($v_{sw}$) of the backward propagation of the vehicle queue 120 may be equal to a slope of the line from a current traffic state (for example, at a first time where the traffic density is 19 veh/km and the traffic flow is 1200 veh/hr) to a jam state (for example, at a second time where the traffic density and the traffic flow are 0).

Figure 1E:
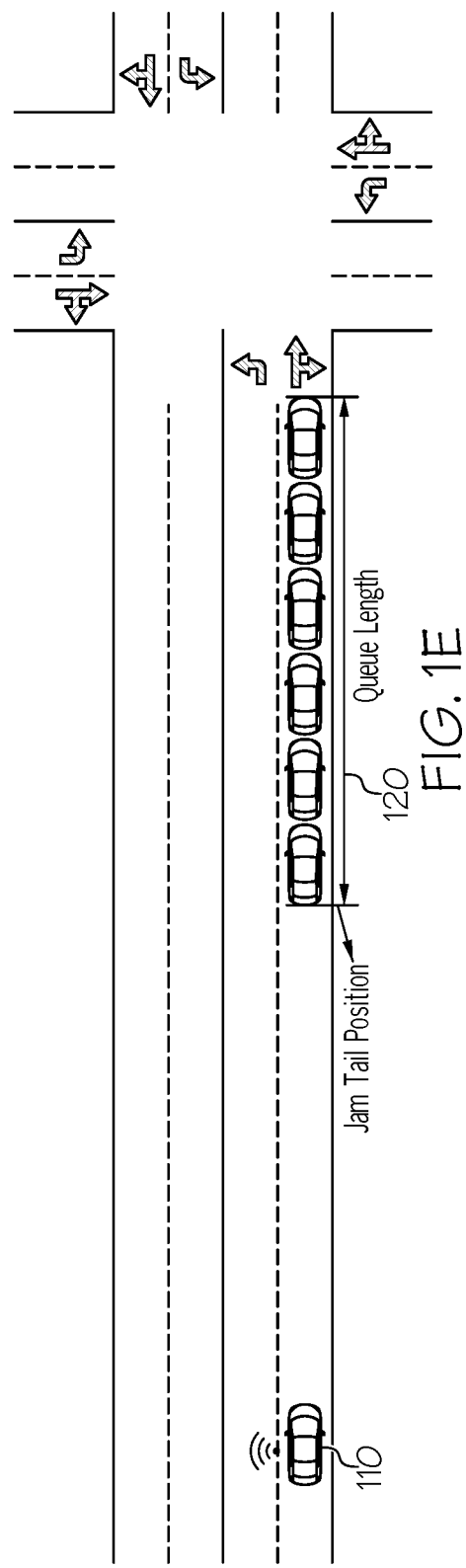

Referring to FIG. 1E, the ego vehicle 110 may estimate a time ($\Delta \widehat{t_{passed}}$) passed from the first red signal 151 started based on the average speed ($v_{sw}$) of the backward propagation of the vehicle queue 120 and a length of the vehicle queue 120. The length of the vehicle queue 120 may refer to a length from a front side of the first vehicle in the vehicle queue 120 from the signal of the intersection and a backside of the closest vehicle in the vehicle queue 120 from the ego vehicle 110. For example, as shown in the below equation 3, a time ($\Delta \widehat{t_{passed}}$) passed from the first red signal 151 started may be estimated by a length of the vehicle queue 120 divided by the average speed ($v_{sw}$). In some embodiments, using a machine learning model, the ego vehicle 110 may estimate a time ($\Delta \widehat{t_{passed}}$) passed from the first red signal 151 started based on the average speed ($v_{sw}$) of the backward propagation of the vehicle queue 120 and a length of the vehicle queue 120.

$$\Delta \widehat{t_{passed}} = \frac{\text{queue length}}{v_{sw}} \qquad \text{Equation 3}$$

Still referring to FIG. 1E, the ego vehicle 110 may estimate a residual time ($\widehat{\Delta t_{res}}$) of a red signal until the first green signal 154 begins based on a total red signal time ($t_R$) and a time ($\Delta \widehat{t_{passed}}$) passed from the first red signal 151 started. For example, as shown in the below equation 4, the residual time ($\widehat{\Delta t_{res}}$) of a red signal until the first green signal 154 begins may be estimated by subtracting a time ($\Delta \widehat{t_{passed}}$) passed from the first red signal 151 started from a total red signal time ($t_R$).

$$\Delta \widehat{t_{res}} = t_R - \Delta \widehat{t_{passed}} \qquad \text{Equation 4}$$

Still referring to FIG. 1E, the ego vehicle 110 may estimate the residual time of the current traffic signal 150 until the change of the current traffic signal 150 using a moving average method as shown in the below equation 5. The moving average of the residual time may be calculated using the below Equation 5.

$$\Delta \widehat{t_{residual}^{t}} = \begin{cases} \Delta t_{residual}^{0} & \text{if } t = 0 \\ \gamma * \Delta \widehat{t_{res}} + (1 - \gamma) * \left( \Delta \widehat{t_{residual}^{t-1}} - \Delta t_{step} \right) & \text{if } t > 0 \end{cases} \qquad \text{Equation 5}$$

where γ is a smoothing factor between 0 and 1; $\Delta t_{residual}^{0}$ is an initial residual time; $\widehat{\Delta t_{res}}$ is the estimated residual time of a red signal until the first green signal 154 begins; $\Delta \widehat{t_{residual}^{t-1}}$ is the estimated residual time of a red signal until the first green signal 154 begins at the previous time step; $\Delta t_{step}$ is a time passed from the previous time step; and $\Delta \widehat{t_{residual}^{t}}$ is the residual time of the current traffic signal 150 until the change of the current traffic signal 150.

Referring to FIG. 1E, the ego vehicle 110 may estimate a final residual time of the current traffic signal 150 until the change of the current traffic signal 150 based on the initial estimated residual time and the estimated residual time of the current traffic signal 150. In embodiments, the ego vehicle 110 may estimate a first residual time of the current traffic signal 150 until the change of the current traffic signal 150 at a first time ($t_1$) based on a moving average of the estimated residual time, i.e., $\Delta t_{residual}^{\hat{t}}$ when t=t$_1$ according to Equation 6. The ego vehicle 110 may estimate a second residual time of the current traffic signal 150 until the change of the current traffic signal 150 at a second time (t$_2$) based on the moving average of the estimated residual time, i.e., $\Delta t_{residual}^{\hat{t}}$ when t=t$_2$ according to Equation 6. The second time is different from the first time. The second time is after the first time. The ego vehicle 110 may determine the second residual time of the current traffic signal 150 until the change of the current traffic signal 150 at the second time as the final residual time in response to determining that a difference between the first residual time of the current traffic signal 150 until the change of the current traffic signal 150 at the first time and the second residual time of the current traffic signal 150 until the change of the current traffic signal 150 at the second time is lower than a threshold value.

For example, the ego vehicle 110 may terminate estimating the residual time of the current traffic signal 150 until the change of the current traffic signal 150 in response to determining that a new estimated residual time, such as a second residual time, is close to the previously estimated residual time, such as a first residual time, as shown in Equation 6.

$$\Delta t_{residual}^{\hat{t}} - \Delta t_{residual}^{\hat{t-1}} < \varepsilon \qquad \text{Equation 6}$$

where ε is a design parameter threshold.

Figure 2:
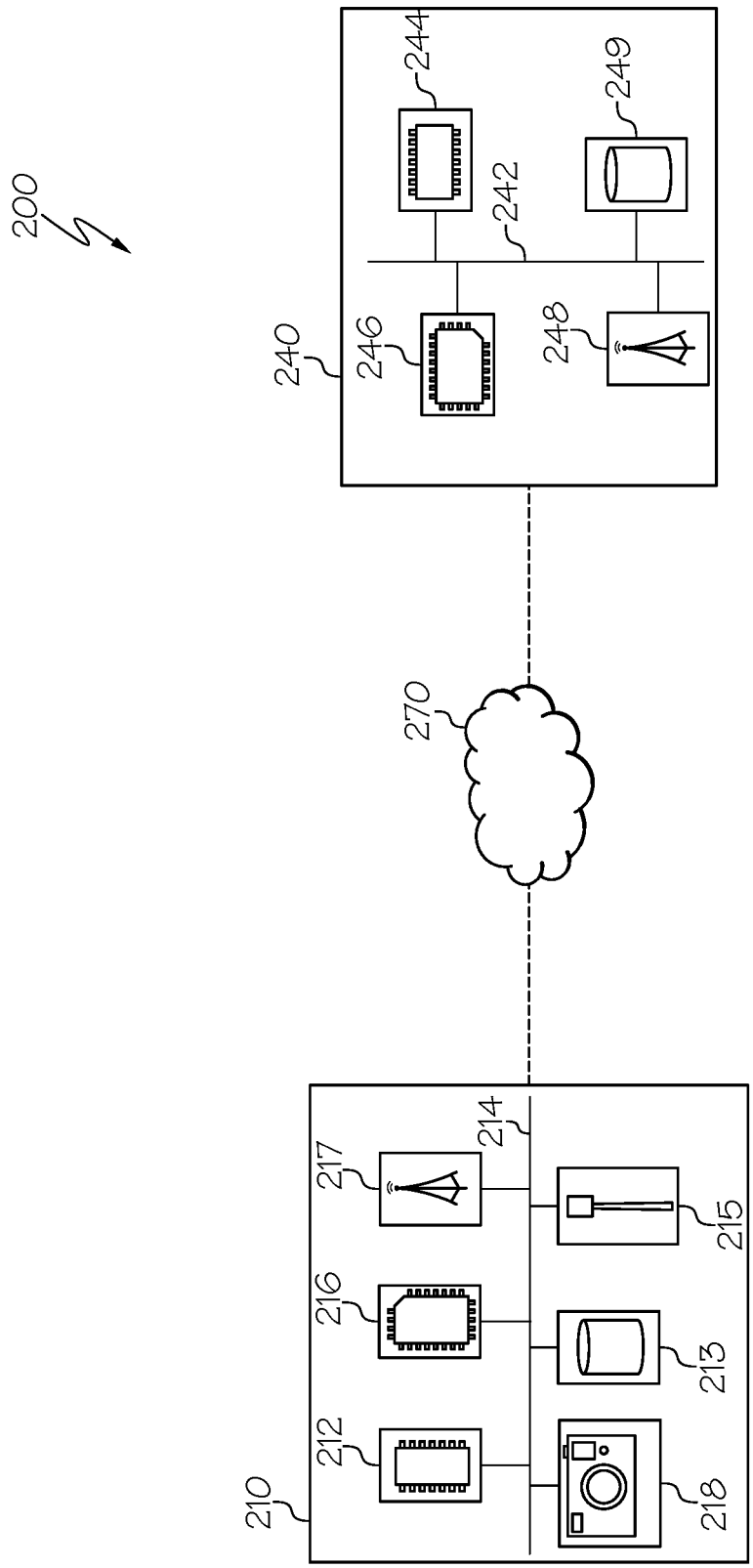
FIG. 2 depicts a schematic diagram of systems of estimating the residual time of a current traffic signal, according to one or more embodiments shown and described herein.

FIG. 2 depicts a schematic diagram of systems of estimating a residual time of a current traffic signal 150, according to one or more embodiments shown and described herein.

Referring to FIG. 2, the system 200 includes a vehicle system 210, and the server 240. The vehicle system 210 includes one or more processors 212. Each of the one or more processors 212 may be any device capable of executing machine-readable and executable instructions. Each of the one or more processors 212 may be a controller, an integrated circuit, a microchip, a computer, or any other computing device. One or more processors 212 are coupled to a communication path 214 that provides signal interconnectivity between various modules of the system. The communication path 214 may communicatively couple any number of processors 212 with one another, and allow the modules coupled to the communication path 214 to operate in a distributed computing environment. Each of the modules may operate as a node that may send and/or receive data. As used herein, the term "communicatively coupled" means that coupled components are capable of exchanging data signals with one another such as electrical signals via a conductive medium, electromagnetic signals via air, optical signals via optical waveguides, and the like.

The communication path 214 may be formed from any medium that is capable of transmitting a signal such as conductive wires, conductive traces, optical waveguides, or the like. In some embodiments, the communication path 214 may facilitate the transmission of wireless signals, such as WiFi, Bluetooth®, Near Field Communication (NFC), and the like. The communication path 214 may be formed from a combination of mediums capable of transmitting signals. In one embodiment, the communication path 214 comprises a combination of conductive traces, conductive wires, connectors, and buses that cooperate to permit the transmission of electrical data signals to components such as processors, memories, sensors, input devices, output devices, and communication devices. The communication path 214 may comprise a vehicle bus, such as a LIN bus, a CAN bus, a VAN bus, and the like. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The vehicle system 210 includes one or more memory modules 216 coupled to the communication path 214 and may contain non-transitory computer-readable medium comprising RAM, ROM, flash memories, hard drives, or any device capable of storing machine-readable and executable instructions such that the machine-readable and executable instructions can be accessed by the one or more processors 212. The machine-readable and executable instructions may comprise logic or algorithm(s) written in any programming language of any generation (e.g., 1 GL, 2 GL, 3 GL, 4 GL, or 5 GL) such as, for example, machine language that may be directly executed by the processor, or assembly language, object-oriented programming (OOP), scripting languages, microcode, etc., that may be compiled or assembled into machine-readable and executable instructions and stored in the one or more memory modules 216. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 212 along with the one or more memory modules 216 may operate as a controller for the vehicle system 210.

Still referring to FIG. 2, the vehicle system 210 includes one or more sensors 218. One or more sensors 218 may be any device having an array of sensing devices capable of detecting radiation in an ultraviolet wavelength band, a visible light wavelength band, or an infrared wavelength band. One or more sensors 218 may detect the presence of the vehicle system 210, the presence of the vehicle queue 120 (shown in FIG. 1A), the distance between the vehicle system 210 and the vehicle queue 120 (shown in FIG. 1A), or combinations thereof. One or more sensors 218 may have any resolution. In some embodiments, one or more optical components, such as a mirror, fish-eye lens, or any other type of lens may be optically coupled to one or more sensors 218. In some embodiments, one or more sensors 218 may provide image data to one or more processors 212 or another component communicatively coupled to the communication path 214. In some embodiments, one or more sensors 218 may provide navigation support. In embodiments, data captured by one or more sensors 218 may be used to autonomously or semi-autonomously navigate the vehicle system 210.

In some embodiments, one or more sensors 218 include one or more imaging sensors configured to operate in the visual and/or infrared spectrum to sense visual and/or infrared light. In some embodiments, one or more sensors 218 include one or more LIDAR sensors, radar sensors, sonar sensors, or other types of sensors for gathering data that could be integrated into or supplement the data collection. Ranging sensors like radar sensors may be used to obtain rough depth and speed information for the view of the vehicle system 210.

The vehicle system 210 includes a satellite antenna 215 coupled to the communication path 214 such that the communication path 214 communicatively couples the satellite antenna 215 to other modules of the vehicle system 210. The satellite antenna 215 is configured to receive signals from global positioning system satellites. In one embodiment, the satellite antenna 215 includes one or more conductive elements that interact with electromagnetic signals transmitted by global positioning system satellites. The received signal is transformed into a data signal indicative of the location (e.g., latitude and longitude) of the satellite antenna 215 or an object positioned near the satellite antenna 215, by one or more processors 212.

The vehicle system 210 includes one or more vehicle sensors 213. Each of one or more vehicle sensors 213 is coupled to the communication path 214 and communicatively coupled to one or more processors 212. One or more vehicle sensors 213 may include one or more motion sensors for detecting and measuring motion and changes in the motion of the vehicle system 210. The motion sensors may include inertial measurement units. Each of the one or more motion sensors may include one or more accelerometers and one or more gyroscopes. Each of one or more motion sensors transforms sensed physical movement of the vehicle into a signal indicative of an orientation, a rotation, a velocity, or an acceleration of the vehicle.

Still referring to FIG. 2, the vehicle system 210 includes a network interface hardware 217 for communicatively coupling the vehicle system 210 to the server 240. The network interface hardware 217 may be communicatively coupled to the communication path 214 and may be any device capable of transmitting and/or receiving data via a network. The network interface hardware 217 may include a communication transceiver for sending and/or receiving any wired or wireless communication. For example, the network interface hardware 217 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 217 includes hardware configured to operate in accordance with the Bluetooth® wireless communication protocol. The network interface hardware 217 of the vehicle system 210 may transmit its data to the server 240. For example, the network interface hardware 217 of the vehicle system 210 may transmit vehicle data, location data, maneuver data, and the like to the server 240.

The vehicle system 210 may connect with one or more external vehicle systems and/or external processing devices (e.g., a server 240) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure.

Vehicles may function as infrastructure nodes to form a mesh network and connect dynamically on an ad-hoc basis. In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using the centralized server and other central computing devices to store and/or relay information between vehicles.

Still referring to FIG. 2, the vehicle system 210 may be communicatively coupled to the server 240, by the network 270. In one embodiment, the network 270 may include one or more computer networks (e.g., a personal area network, a local area network, or a wide area network), cellular networks, satellite networks and/or a global positioning system and combinations thereof. The vehicle system 210 may be communicatively coupled to the network 270 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 includes one or more processors 244, one or more memory modules 246, a network interface hardware 248, one or more vehicle sensors 249, and a communication path 242 communicatively connected to the other components of the vehicle system 210. The components of the server 240 may be structurally similar to and have similar functions as the corresponding components of the vehicle system 210 (e.g., the one or more processors 244 corresponds to the one or more processors 212, the one or more memory modules 246 corresponds to the one or more memory modules 216, the one or more vehicle sensors 249 corresponds to the one or more vehicle sensors 213, the communication path 242 corresponds to the communication path 214, and the network interface hardware 248 corresponds to the network interface hardware 217).

It should be understood that the components illustrated in FIG. 2 are merely illustrative and are not intended to limit the scope of this disclosure. More specifically, while the components in FIG. 2 are illustrated as residing within the vehicle system 210, this is a non-limiting example. In some embodiments, one or more of the components may reside external to the vehicle system 210, such as with the server 240.

Figure 3:
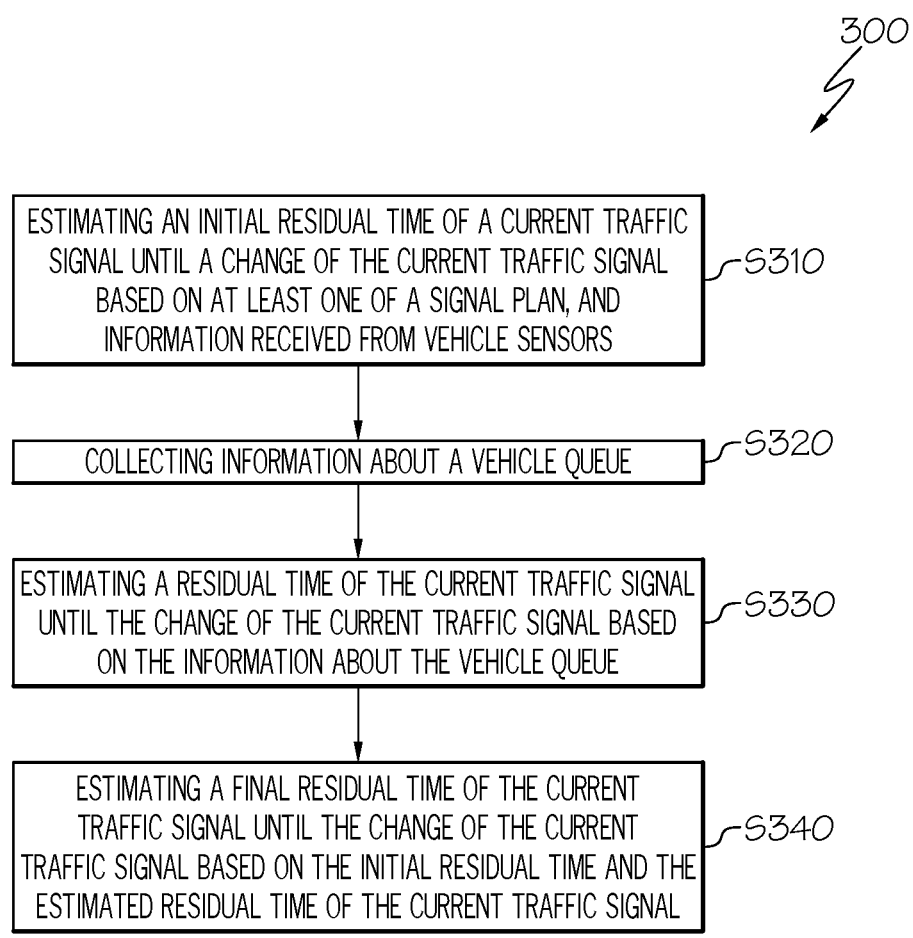
FIG. 3 depicts a flowchart for methods of estimating the residual time of a current traffic signal, according to one or more embodiments shown and described herein.

FIG. 3 depicts a flowchart for methods 300 of estimating a residual time of a current traffic signal 150 that may be performed by the systems of FIGS. 1A-1E, according to one or more embodiments shown and described herein.

Referring to FIG. 3, in step S310, a controller, e.g., the controller of an ego vehicle 110, may estimate an initial residual time of a current traffic signal 150 until a change of the current traffic signal 150 based on a signal plan and information received from vehicle sensors. The vehicle queue 120 may include a plurality of vehicles. In some embodiments, the vehicle queue 120 may exist and stop at the intersection, an on-ramp of a highway, an off-ramp of a highway, or combinations thereof. For example, referring to FIGS. 1A, 4A, 5, and 6, the vehicle queue 120 may exist and stop at the intersection. The map of the intersection may be stored in the server 240.

Figure 4A:
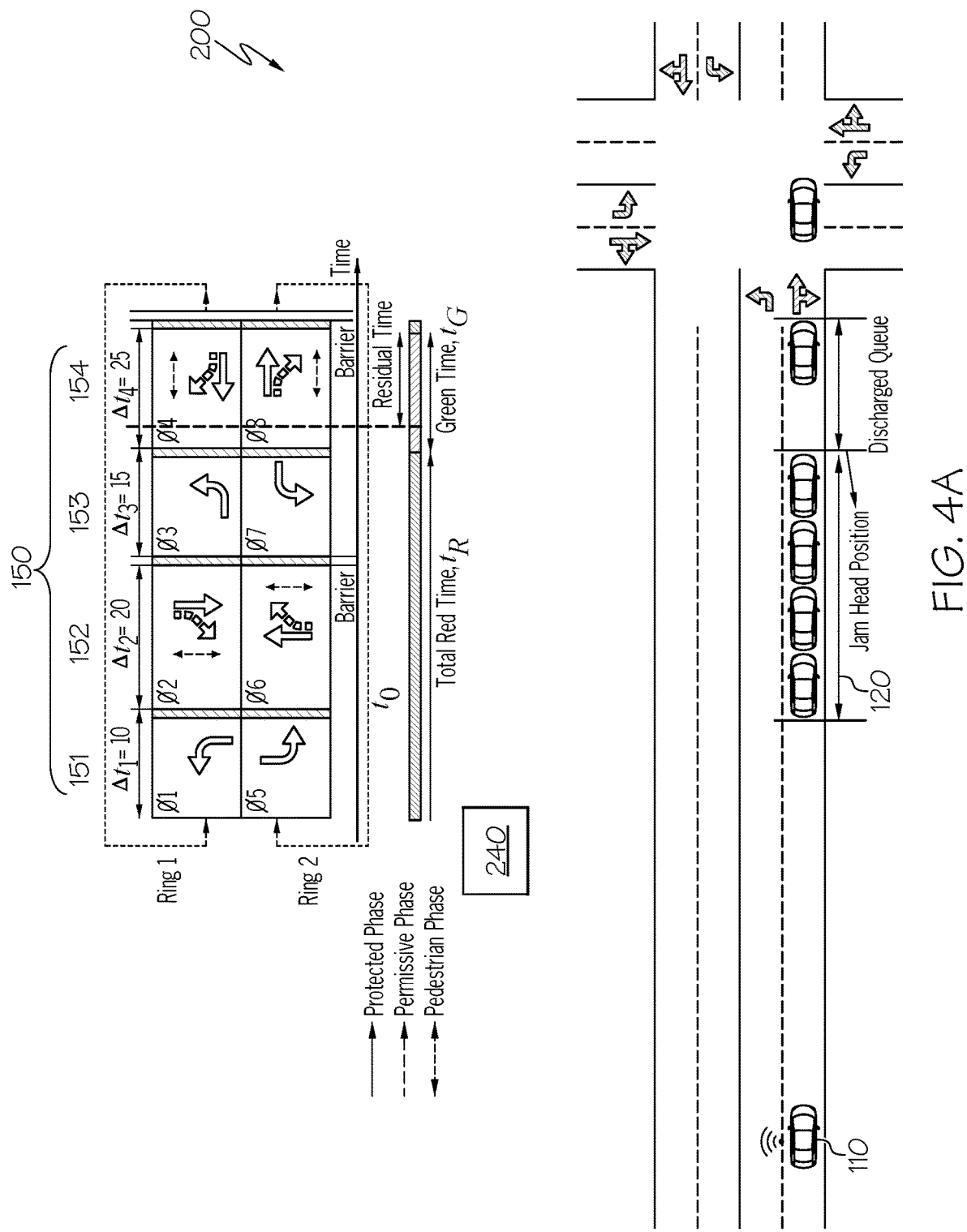
FIGS. 4A-4C depict an exemplary system of estimating the residual time of a current traffic signal, according to one or more embodiments shown and described herein.
Figure 4B:
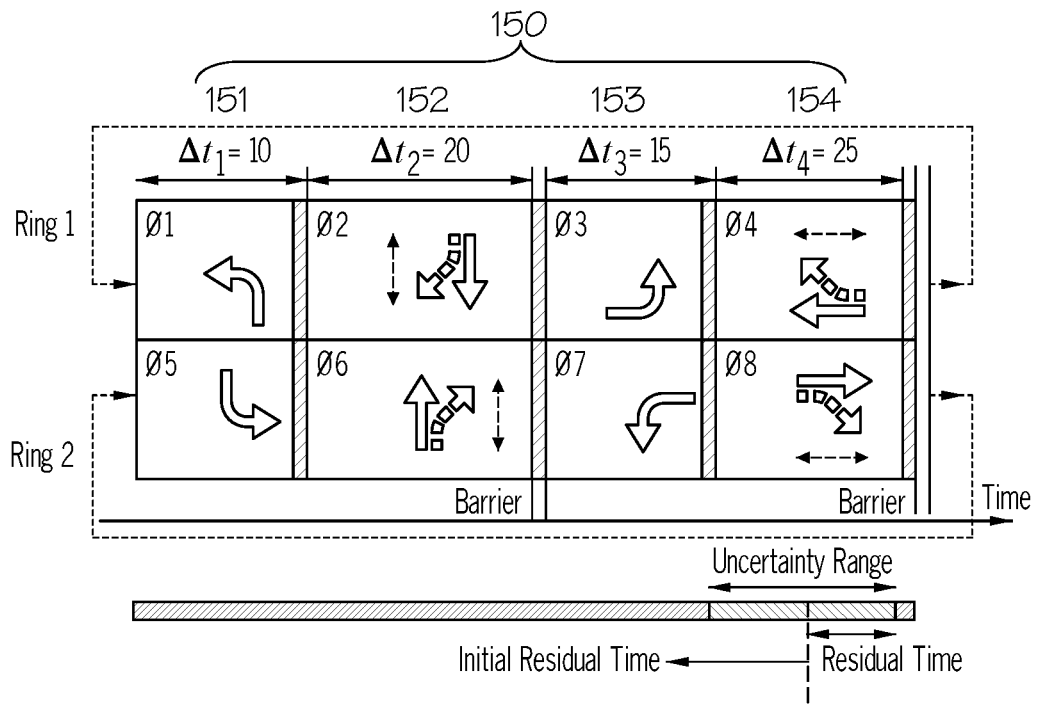
Figure 5:
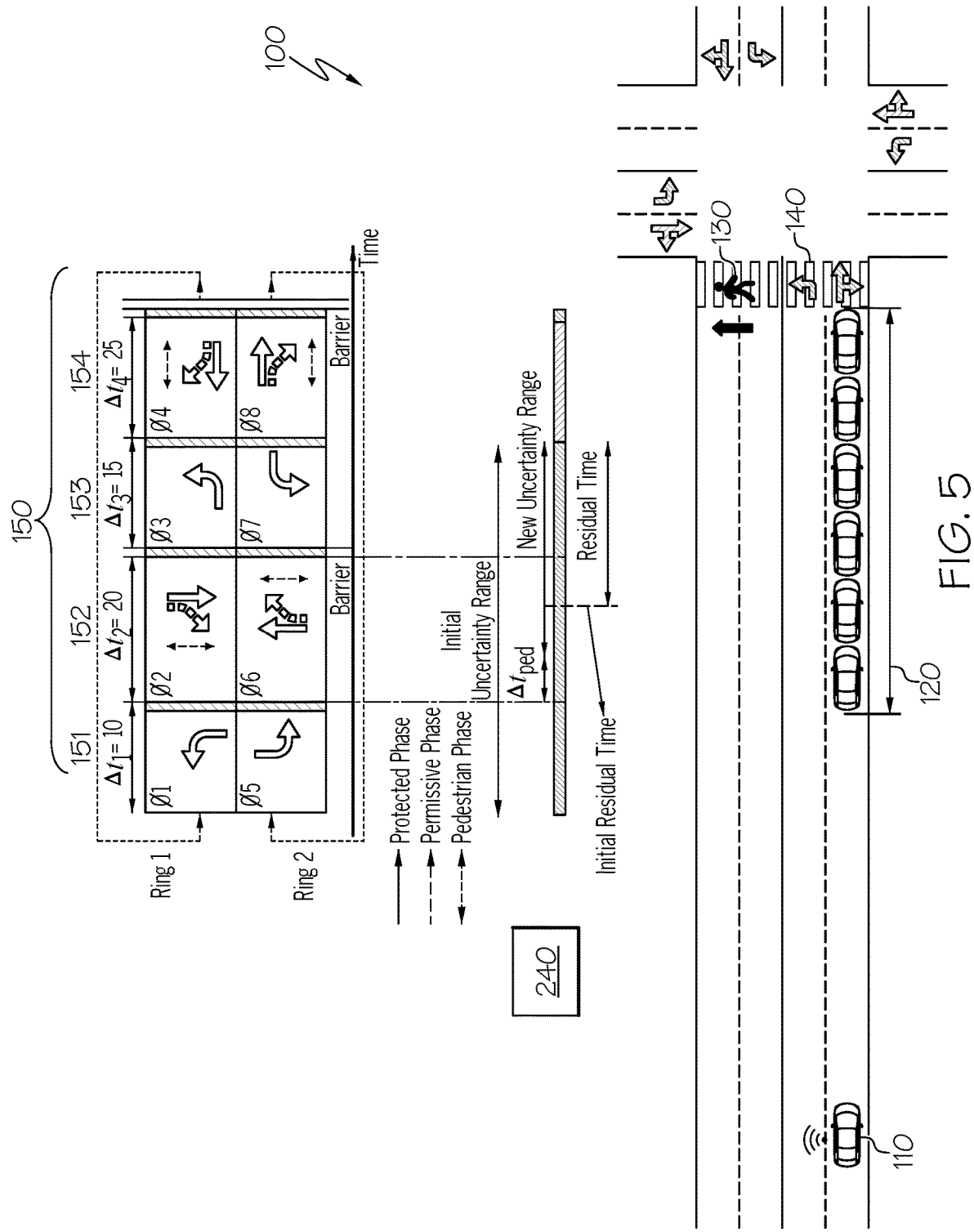
FIG. 5 depicts an exemplary system of estimating the residual time of a current traffic signal, according to one or more embodiments shown and described herein.
Figure 6:
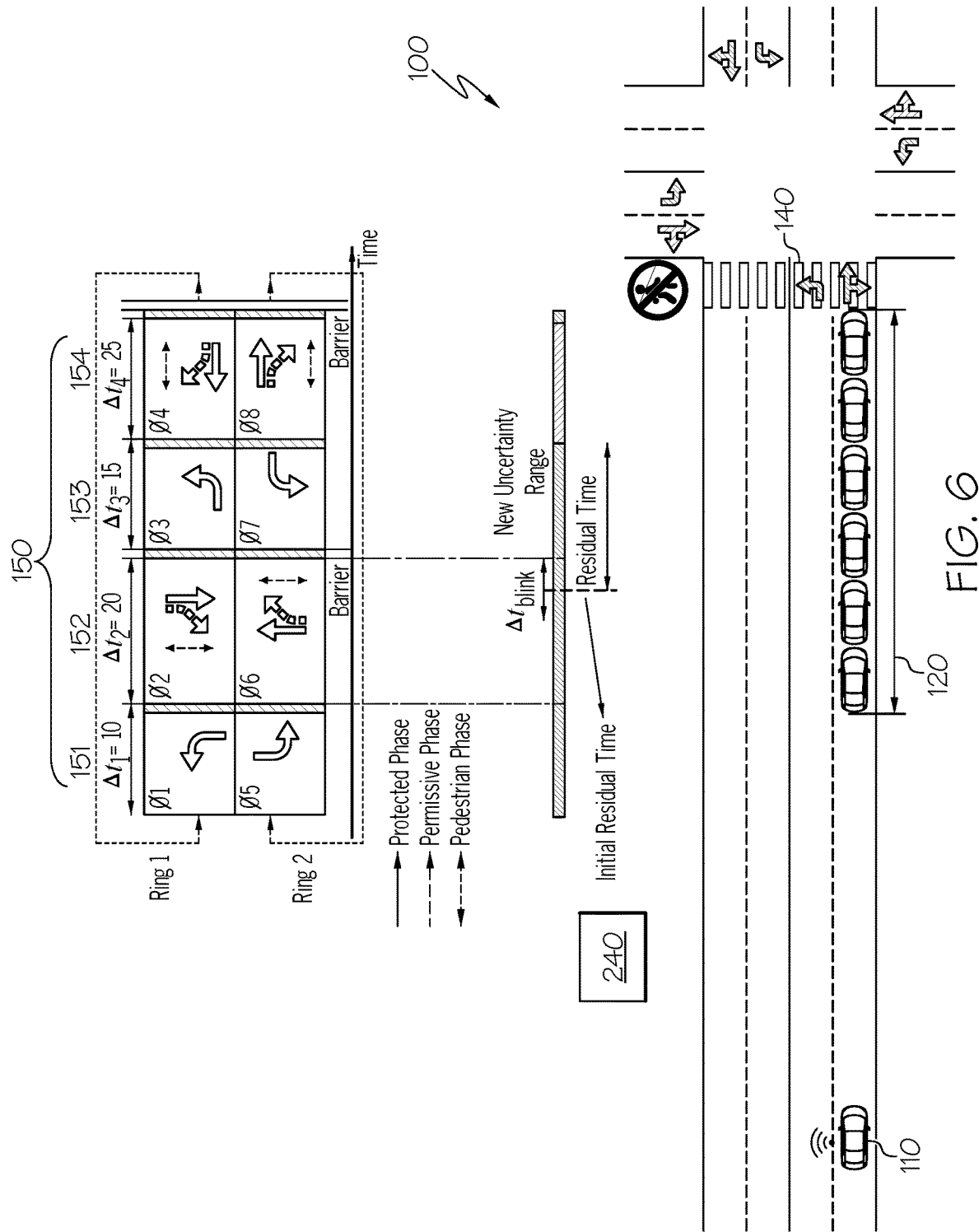
FIG. 6 depicts an exemplary system of estimating the residual time of a current traffic signal, according to one or more embodiments shown and described herein.

Referring to FIGS. 1A-1B, the controller may determine a middle point of a total time ($t_R$) of the first red signal 151, the second red signal 152, and the third red signal 153 as the initial residual time, for example, as shown in the above Equation 1. Referring to FIGS. 1A and 1C, the controller may detect the current traffic signal 150 and the movement of other vehicle excluded from the vehicle queue 120 by the vehicle sensors. In response to detecting the current traffic signal 150 being the second red signal 152 and the movement of other vehicle excluded from the vehicle queue 120, the controller may determine a sum of a total time of the third red signal 153 and a middle point of a time of the second red signal 152 as the initial residual time, for example, as shown in the above Equation 2. Referring to FIGS. 4A-4B, the controller may detect the current traffic signal 150. In response to detecting the current traffic signal 150 being the first green signal 154, the controller may determine a middle point of a total time of the first green signal 154 as the initial residual time, for example, as shown in the below Equation 7. Referring to FIG. 5, the controller may detect the current traffic signal 150 and the movement of the pedestrian 130 by the vehicle sensors. In response to detecting the current traffic signal 150 being the second red signal 152 and detecting the movement of the pedestrian 130, to estimate the initial residual time, the controller may subtract a time of crossing a road 140 of the pedestrian 130 from a total time of the second red signal 152 to obtain a remaining time. The controller may determine a sum of a total time of the third red signal 153 and the remaining time as the initial residual time, for example, as shown in the below Equation 10. Referring to FIG. 6, the controller may detect the current traffic signal 150 and a signal for the pedestrian 130 by the vehicle sensors. In response to detecting the current traffic signal 150 being the second red signal 152 and detecting the signal for the pedestrian 130 being blinking, to estimate the initial residual time, the controller may detect a duration of the signal for the pedestrian 130. The controller may determine a sum of a total time of the third red signal 153 and a middle point of the time of blinking the signal for the pedestrian 130 as the initial residual time, for example, as shown in the below Equation 11.

Referring to FIG. 3, in step S320, the controller may collect information about a vehicle queue 120. In embodiments, the controller may collect information about the vehicle queue 120 detected by the vehicle sensors, such as the vehicle sensors of the ego vehicle 110. In some embodiments, the controller may collect information about the vehicle queue 120 by receiving information about the vehicle queue 120 from the server 240, such as a cloud server. Information about the vehicle queue 120 may include a length of the vehicle queue 120, a position of a tail of the vehicle queue 120, a position of a head of the vehicle queue 120, the position of the vehicle queue 120 relative to the intersection, the position of the vehicle queue 120 relative to the ego vehicle 110, the movement of the pedestrian 130 in the intersection, the movement of other vehicles at other approaches in the intersection, the traffic signal at other approaches in the intersection, a signal for the pedestrian 130, a road density in the intersection, or combinations thereof.

Referring to FIG. 3, in step S330, the controller may estimate a residual time of the current traffic signal 150 until the change of the current traffic signal 150 based on the information about the vehicle queue 120. For example, referring to FIG. 1A-1E, the controller may estimate traffic flow rate on the road on which the ego vehicle 110 is driving, traffic density on the road on which the ego vehicle 110 is driving, or both. The controller may estimate the average speed ($v_{sw}$) of the backward propagation of the vehicle queue 120 based on the estimated traffic flow rate, the estimated traffic density, or both. The ego vehicle 110 may estimate a time ($\widehat{\Delta t_{passed}}$) passed from the first red signal 151 started based on the average speed ($v_{sw}$) of the vehicle queue 120 and a length of the vehicle queue 120, for example, as shown in the above Equation 3 or using a machine learning model. The controller may estimate a residual time ($\widehat{\Delta t_{res}}$) of a red signal until the first green signal 154 begins based on a total red signal time ($t_R$) and a time ($\widehat{\Delta t_{passed}}$) passed from the first red signal 151 started, for example, as shown in the above Equation 4. The controller may estimate the residual time of the current traffic signal 150 until the change of the current traffic signal 150 using a moving average method, for example, as shown in the above Equation 5. For example, referring to FIG. 4A-4C, the controller may estimate traffic flow rate on the road on which the ego vehicle 110 is driving, traffic density on the road on which the ego vehicle 110 is driving, or both. Using a macroscopic traffic model shown in FIG. 4C, the controller may estimate the average speed ($v_{sw}$) of the vehicle queue 120 based on the estimated traffic flow rate, the estimated traffic density, or both. The controller may estimate a time ($\widehat{\Delta t_{passed}}$) passed from the first green signal 154 started based on the average speed ($v_{sw}$) of the vehicle queue 120 and a discharged length of the vehicle queue 120, for example, as shown in the below Equation 8, or using a machine learning model. The controller may estimate a residual time ($\widehat{\Delta t_{res}}$) of a green signal based on a total green signal time ($t_R$) and a time ($\widehat{\Delta t_{passed}}$) passed from the first green signal 154 started, for example, as shown in the below Equation 9.

Referring to FIG. 3, in step S340, the controller may estimate a final residual time of the current traffic signal 150 until the change of the current traffic signal 150 based on the initial residual time and the estimated residual time of the current traffic signal 150. Referring to FIG. 1E, the controller may estimate a final residual time of the current traffic signal 150 until the change of the current traffic signal 150 based on the initial residual time and the estimated residual time of the current traffic signal 150. In embodiments, the controller may estimate a first residual time of the current traffic signal 150 at a first time until the change of the current traffic signal 150 based on a moving average of the estimated residual time. The controller may estimate a second residual time of the current traffic signal 150 at a second time until the change of the current traffic signal 150 based on the moving average of the estimated residual time. The controller may determine the second residual time as the final residual time of the current traffic signal 150 until the change of the current traffic signal 150 in response to determining that a difference between the first residual time and the second residual time is lower than a threshold value. The controller may estimate the final residual time of the current traffic signal 150 until the change of the current traffic signal 150, for example, as shown in the above Equation 6.

Figure 4C:
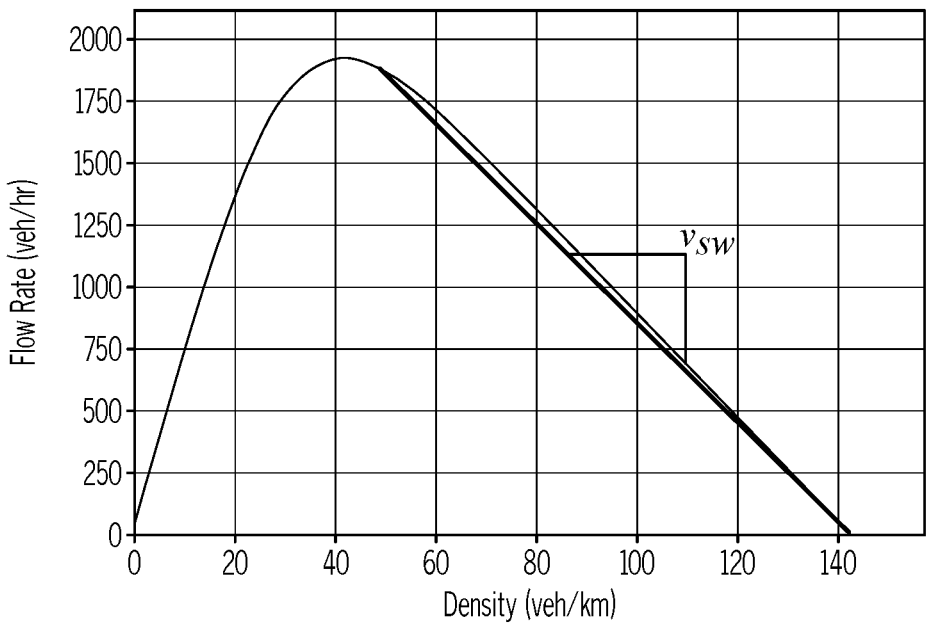

FIGS. 4A-4C depict an exemplary system 100 of estimating a residual time of a current traffic signal 150, according to one or more embodiments shown and described herein.

Referring to FIG. 4A, the vehicle queue 120 may exist and stop at the intersection. The map of the intersection may be stored in the server 240. The vehicle queue 120 may include a plurality of vehicles. The ego vehicle 110 may approach the vehicle queue 120 when the current traffic signal 150 is the first green signal 154.

Still referring to FIG. 4A, the ego vehicle 110 may determine estimating an initial residual time of a current traffic signal 150 until a change of the current traffic signal 150 based on a signal plan and information received from vehicle sensors.

Referring to FIG. 4B, the ego vehicle 110 may detect the current traffic signal 150. In response to detecting the current traffic signal 150 being the first green signal 154, the ego vehicle 110 may determine a middle point of a total time of the first green signal 154 as the initial residual time. For example, as shown in the below equation 7, a middle point $$\left(\frac{t_G}{2}\right)$$

of a total time ($t_G$) of the first green signal 154 may be determined as the initial residual time ($\Delta t_0^{res}$).

$$\Delta t_0^{res} = \frac{t_G}{2} = 12.5\, s \qquad \text{Equation 7}$$

Referring to FIG. 4B, the ego vehicle 110 may estimate traffic flow rate on the road on which the ego vehicle 110 is driving, traffic density on the road on which the ego vehicle 110 is driving, or both. In some embodiments, the traffic flow rate, the traffic density, or both, may be estimated by the vehicle sensors of the ego vehicle 110. Using a macroscopic traffic model shown in FIG. 4C, the ego vehicle 110 may estimate the average speed ($v_{sw}$) of the vehicle queue 120 based on the estimated traffic flow rate, the estimated traffic density, or both. For example, the average speed ($v_{sw}$) of the vehicle queue 120 may be equal to a slope of the line from a current traffic state (for example, at a first time where the traffic density is 50 veh/km) to a jam state (for example, at a second time where the traffic density and the traffic flow are 0).

Referring to FIGS. 4A-4C, the ego vehicle 110 may estimate a time ($\Delta \widehat{t_{passed}}$) passed from the first green signal 154 started based on the average speed ($v_{sw}$) of the vehicle queue 120 and a discharged length of the vehicle queue 120. The term "discharged length of the vehicle queue 120" may refer to a length of the vehicle queue 120 that has been discharged since the beginning of the first green signal 154. For example, as shown in the below equation 8, a time ($\Delta \widehat{t_{passed}}$) passed from the first green signal 154 started may be estimated by a discharged length of the vehicle queue 120 divided by the average speed ($v_{sw}$). In some embodiments, using a machine learning model, the ego vehicle 110 may estimate a time ($\Delta \widehat{t_{passed}}$) passed from the first green signal 154 started based on the average speed ($v_{sw}$) of the vehicle queue 120 and a discharged length of the vehicle queue 120.

$$\Delta \widehat{t_{passed}} = \frac{\text{discharged queue length}}{v_{sw}} \qquad \text{Equation 8}$$

Still referring to FIGS. 4A-4C, the ego vehicle 110 may estimate a residual time ($\widehat{\Delta t_{res}}$) of a green signal based on a total green signal time ($t_R$) and a time ($\Delta \widehat{t_{passed}}$) passed from the first green signal 154 started. For example, as shown in the below equation 9, the residual time ($\widehat{\Delta t_{res}}$) of a green signal may be estimated by subtracting a time ($\Delta \widehat{t_{passed}}$) passed from the first green signal 154 started from a total green signal time ($t_G$).

$$\Delta \widehat{t_{res}} = t_G - \Delta \widehat{t_{passed}} \qquad \text{Equation 9}$$

Similar to FIG. 1E, the ego vehicle 110 may collect information about the vehicle queue 120. The ego vehicle 110 may estimate the residual time of the current traffic signal 150 until the change of the current traffic signal 150 using a moving average method, for example, as shown in the above Equation 5.

Similar to FIG. 1E, the ego vehicle 110 may estimate a final residual time of the current traffic signal 150 until the change of the current traffic signal 150 based on the initial residual time and the estimated residual time of the current traffic signal 150. In embodiments, the ego vehicle 110 may estimate a first residual time of the current traffic signal 150 at a first time until the change of the current traffic signal 150 based on a moving average of the estimated residual time. The ego vehicle 110 may estimate a second residual time of the current traffic signal 150 at a second time until the change of the current traffic signal 150 based on the moving average of the estimated residual time. The ego vehicle 110 may determine the second residual time as the final residual time of the current traffic signal 150 until the change of the current traffic signal 150 in response to determining that a difference between the first residual time and the second residual time is lower than a threshold value. The ego vehicle 110 may estimate the final residual time of the current traffic signal 150 until the change of the current traffic signal 150, for example, as shown in the above Equation 6.

FIG. 5 depicts an exemplary system 100 of estimating a residual time of a current traffic signal 150, according to one or more embodiments shown and described herein.

Referring to FIG. 5, the vehicle queue 120 may exist and stop at the intersection. The map of the intersection may be stored in the server 240. The vehicle queue 120 may include a plurality of vehicles. The ego vehicle 110 may approach the vehicle queue 120 when the current traffic signal 150 is the second red signal 152. The pedestrian 130 is crossing a road 140 of the pedestrian 130 in front of the vehicle queue 120.

The ego vehicle 110 may detect the current traffic signal 150 and the movement of the pedestrian 130 by the vehicle sensors. The ego vehicle 110 may detect the current traffic signal 150 being the second red signal 152 and detect the movement of the pedestrian 130.

Still referring to FIG. 5, the ego vehicle 110 may estimate an initial residual time of a current traffic signal 150 until a change of the current traffic signal 150 based on a signal plan and information received from vehicle sensors. To estimate the initial residual time, the ego vehicle 110 may subtract a time of crossing a road 140 of the pedestrian 130 from a total time of the second red signal 152 to obtain a remaining time. For example, the ego vehicle 110 may detect a length of the road 140 of the pedestrian 130 is 12 meters. In some embodiments, the ego vehicle 110 may receive the data of the length of the road 140 of the pedestrian 130 from the signal plan stored on the server 240. The ego vehicle 110 may further detect a speed of the pedestrian 130 is 1.5 meter/seconds. The ego vehicle 110 may estimate a time of crossing a road 140 of the pedestrian 130 based on a length of the road 140 of the pedestrian 130 and a speed of the pedestrian 130. For example, a time of crossing a road 140 of the pedestrian 130 may be estimated by dividing the length of the road 140 of the pedestrian 130 by the speed of the pedestrian 130. When the length of the road 140 of the pedestrian 130 is 12 meters and the speed of the pedestrian 130 is 1.5 meter/seconds, the time of crossing a road 140 of the pedestrian 130 is 8 seconds. The remaining time of the second red signal 152 may be estimated by subtracting the time of crossing a road 140 of the pedestrian 130 from the time of the second red signal 152.

The ego vehicle 110 may determine a sum of a total time of the third red signal 153 and the remaining time as the initial residual time. For example, as shown in the below equation 10, the initial residual time ($\Delta t_0^{res}$) may be determined as a sum of a total time ($\Delta t_{\phi 3}$) of the third red signal 153 and the remaining time $$\left(\frac{\Delta t_{\phi 2} - \Delta t_{ped}}{2}\right).$$

$$\Delta t_0^{res} = \Delta t_{\phi 3} + \frac{\Delta t_{\phi 2} - \Delta t_{ped}}{2} = 15 + \frac{20 - 8}{2} = 21\ s \qquad \text{Equation 10}$$

Similar to FIG. 1E, the ego vehicle 110 may collect information about the vehicle queue 120. The ego vehicle 110 may estimate the residual time of the current traffic signal 150 until the change of the current traffic signal 150 using a moving average method, for example, as shown in the above Equation 5.

Similar to FIG. 1E, the ego vehicle 110 may estimate a final residual time of the current traffic signal 150 until the change of the current traffic signal 150 based on the initial residual time and the estimated residual time of the current traffic signal 150. In embodiments, the ego vehicle 110 may estimate a first residual time of the current traffic signal 150 at a first time until the change of the current traffic signal 150 based on a moving average of the estimated residual time. The ego vehicle 110 may estimate a second residual time of the current traffic signal 150 at a second time until the change of the current traffic signal 150 based on the moving average of the estimated residual time. The ego vehicle 110 may determine the second residual time as the final residual time of the current traffic signal 150 until the change of the current traffic signal 150 in response to determining that a difference between the first residual time and the second residual time is lower than a threshold value. The ego vehicle 110 may estimate the final residual time of the current traffic signal 150 until the change of the current traffic signal 150, for example, as shown in the above Equation 6.

FIG. 6 depicts an exemplary system 100 of estimating a residual time of a current traffic signal 150, according to one or more embodiments shown and described herein.

Referring to FIG. 6, the vehicle queue 120 may exist and stop at the intersection. The map of the intersection may be stored in the server 240. The vehicle queue 120 may include a plurality of vehicles. The ego vehicle 110 may approach the vehicle queue 120 when the current traffic signal 150 is the second red signal 152. A signal for the pedestrian 130 in front of the vehicle queue 120 may be blinking.

The ego vehicle 110 may detect the current traffic signal 150 and a signal for the pedestrian 130 by the vehicle sensors. The ego vehicle 110 may detect the current traffic signal 150 being the second red signal 152 and detect the signal for the pedestrian 130 being blinking.

Still referring to FIG. 6, the ego vehicle 110 may estimate an initial residual time of a current traffic signal 150 until a change of the current traffic signal 150 based on a signal plan and information received from vehicle sensors. To estimate the initial residual time, the ego vehicle 110 may detect a duration of the signal for the pedestrian 130. In some embodiments, the ego vehicle 110 may receive the data of the length of the road 140 of the pedestrian 130 from the signal plan stored on the server 240. For example, the duration of the signal for the pedestrian 130 may be 10 seconds.

The ego vehicle 110 may determine a sum of a total time of the third red signal 153 and a middle point of the time of blinking the signal for the pedestrian 130 as the initial residual time. For example, as shown in the below equation 11, the initial residual time ($\Delta t_0^{res}$) may be determined as a sum of a total time ($\Delta t_{\phi 3}$) of the third red signal 153 and the middle point $$\left(\frac{\Delta t_{blink}}{2}\right)$$

of the time of blinking the signal for the pedestrian 130.

$$\Delta t_0^{res} = \Delta t_{\phi 3} + \frac{\Delta t_{blink}}{2} = 15 + \frac{10}{2} = 20\ s \qquad \text{Equation 11}$$

Similar to FIG. 1E, the ego vehicle 110 may collect information about the vehicle queue 120. The ego vehicle 110 may estimate the residual time of the current traffic signal 150 until the change of the current traffic signal 150 using a moving average method, for example, as shown in the above Equation 5.

Similar to FIG. 1E, the ego vehicle 110 may estimate a final residual time of the current traffic signal 150 until the change of the current traffic signal 150 based on the initial residual time and the estimated residual time of the current traffic signal 150. In embodiments, the ego vehicle 110 may estimate a first residual time of the current traffic signal 150 at a first time until the change of the current traffic signal 150 based on a moving average of the estimated residual time. The ego vehicle 110 may estimate a second residual time of the current traffic signal 150 at a second time until the change of the current traffic signal 150 based on the moving average of the estimated residual time. The ego vehicle 110 may determine the second residual time as the final residual time of the current traffic signal 150 until the change of the current traffic signal 150 in response to determining that a difference between the first residual time and the second residual time is lower than a threshold value. The ego vehicle 110 may estimate the final residual time of the current traffic signal 150 until the change of the current traffic signal 150, for example, as shown in the above Equation 6.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

What is claimed is:

1. A method comprising:
   estimating, by an ego vehicle, an initial residual time of a current traffic signal until a change of the current traffic signal based on a signal plan and information received from vehicle sensors of the ego vehicle;
   collecting information, by the ego vehicle, about a vehicle queue, from at least one of the vehicle sensors or a server;
   estimating, by the ego vehicle, a residual time of the current traffic signal until the change of the current traffic signal based on the information about the vehicle queue;
   estimating, by the ego vehicle, a final residual time of the current traffic signal until the change of the current traffic signal based on the initial residual time and the estimated residual time of the current traffic signal; and
   controlling, by an actuator of the ego vehicle, movement of the ego vehicle to autonomously drive based on the estimating of the final residual time of the current traffic signal.

2. The method according to claim 1, further comprising:
   estimating a first residual time of the current traffic signal at a first time until the change of the current traffic signal based on a moving average of the estimated residual time;
   estimating a second residual time of the current traffic signal at a second time until the change of the current traffic signal based on the moving average of the estimated residual time; and
   determining the second residual time at the second time as the final residual time in response to determining that a difference between the first residual time at the first time and the second residual time at the second time is lower than a threshold value.

3. The method according to claim 1, wherein:
   the current traffic signal comprises a first red signal, a second red signal, a third red signal, and a first green signal, and
   a pedestrian moves in the second red signal.

4. The method according to claim 3, further comprising:
   detecting the current traffic signal by the vehicle sensors;
   in response to detecting the current traffic signal, determining a middle point of a total time of the first red signal, the second red signal, and the third red signal as the initial residual time.

5. The method according to claim 3, further comprising:
   detecting the current traffic signal and movement of other vehicle excluded from the vehicle queue by the vehicle sensors; and
   in response to detecting the current traffic signal being the second red signal and detecting the movement of other vehicle being a different direction from the vehicle queue, determining a sum of a total time of the third red signal and a middle point of a time of the second red signal as the initial residual time.

6. The method according to claim 3, further comprising:
   in response to detecting the current traffic signal by the vehicle sensors being the first green signal, determining a middle point of a total time of the first green signal as the initial residual time.

7. The method according to claim 6, further comprising:
   estimating traffic flow rate, traffic density, or both;
   estimating an average speed of backward propagation of the vehicle queue based on the estimated traffic flow rate, the estimated traffic density, or both;
   estimating a time passed from the first green signal started based on the average speed of the backward propagation of the vehicle queue and a discharged length of the vehicle queue; and
   estimating the final residual time of the current traffic signal until the change of the current traffic signal based on the initial residual time, and the estimated time passed from the first green signal started.

8. The method according to claim 3, further comprising:
   detecting the current traffic signal and movement of the pedestrian by the vehicle sensors; and
   in response to detecting the current traffic signal being the second red signal and detecting the movement of the pedestrian:
   subtracting a time of crossing a road of the pedestrian from a total time of the second red signal to obtain a remaining time; and determining a sum of a total time of the third red signal and the remaining time as the initial residual time.

9. The method according to claim 3, further comprising:
detecting the current traffic signal and a signal for the pedestrian by the vehicle sensors;
in response to detecting the current traffic signal being the second red signal and detecting the signal for the pedestrian being blinking, determining a sum of a total time of the third red signal and a middle point of the time of blinking the signal for the pedestrian as the initial residual time.

10. The method according to claim 3, further comprising:
estimating traffic flow rate, traffic density, or both;
estimating an average speed of backward propagation of the vehicle queue based on the estimated traffic flow rate, the estimated traffic density, or both;
estimating a time passed from the first red signal started based on the average speed of the backward propagation of the vehicle queue and a length of the vehicle queue; and
estimating the final residual time of the current traffic signal until the change of the current traffic signal based on the initial residual time, and the estimated time passed from the first red signal started.

11. The method according to claim 10, wherein the traffic flow rate, the traffic density, or both, are estimated by the vehicle sensors.

12. The method according to claim 10, wherein the average speed of the backward propagation of the vehicle queue is determined using a macroscopic traffic model.

13. A system comprising:
a controller programmed to:
estimate an initial residual time of a current traffic signal until a change of the current traffic signal based on a signal plan and information received from vehicle sensors;
collect information about a vehicle queue;
estimate a residual time of the current traffic signal until the change of the current traffic signal based on the information about the vehicle queue;
estimate a final residual time of the current traffic signal until the change of the current traffic signal based on the initial residual time and the estimated residual time of the current traffic signal; and
control, via an actuator of the ego vehicle, movement of the ego vehicle to autonomously drive based on the estimate of the final residual time of the current traffic signal.

14. The system according to claim 13, wherein the controller is further programmed to:
estimate a first residual time of the current traffic signal at a first time until the change of the current traffic signal based on a moving average of the estimated residual time;
estimate a second residual time of the current traffic signal at a second time until the change of the current traffic signal based on the moving average of the estimated residual time; and
determine the second residual time at the second time as the final residual time in response to determining that a difference between the first residual time at the first time and the second residual time at the second time is lower than a threshold value.

15. The system according to claim 13, wherein:
the current traffic signal comprises a first red signal, a second red signal, a third red signal, and a first green signal, and
a pedestrian moves in the second red signal.

16. The system according to claim 15, wherein the controller is further programmed to:
detect the current traffic signal by the vehicle sensors;
in response to detecting the current traffic signal, determine a middle point of a total time of the first red signal, the second red signal, and the third red signal as the initial residual time.

17. The system according to claim 15, wherein the controller is further programmed to:
detect the current traffic signal and movement of other vehicle excluded from the vehicle queue by the vehicle sensors; and
in response to detecting the current traffic signal being the second red signal and detecting the movement of other vehicle being a different direction from the vehicle queue, determine a sum of a total time of the third red signal and a middle point of a time of the second red signal as the initial residual time.

18. The system according to claim 15, wherein the controller is further programmed to:
in response to detecting the current traffic signal by the vehicle sensors being the first green signal, determine a middle point of a total time of the first green signal as the initial residual time.

19. The system according to claim 18, wherein the controller is further programmed to:
estimate traffic flow rate, traffic density, or both;
estimate an average speed of backward propagation of the vehicle queue based on the estimated traffic flow rate, the estimated traffic density, or both;
estimate a time passed from the first green signal started based on the average speed of the backward propagation of the vehicle queue and a discharged length of the vehicle queue; and
estimate the final residual time of the current traffic signal until the change of the current traffic signal based on the initial residual time, and the estimated time passed from the first green signal started.

20. A non-transitory computer-readable medium that, when executed by a controller, cause the controller to:
estimate an initial residual time of a current traffic signal until a change of the current traffic signal based on a signal plan and information received from vehicle sensors;
collect information about a vehicle queue;
estimate a residual time of the current traffic signal until the change of the current traffic signal based on the information about the vehicle queue;
estimate a final residual time of the current traffic signal until the change of the current traffic signal based on the initial residual time and the estimated residual time of the current traffic signal; and
control, via an actuator of the ego vehicle, movement of the ego vehicle to autonomously drive based on the estimate of the final residual time of the current traffic signal.

* * * * *